(12) United States Patent
Ogasawara

(10) Patent No.: US 10,146,844 B2
(45) Date of Patent: Dec. 4, 2018

(54) DATA RETRIEVAL APPARATUS, DATA RETRIEVAL PROGRAM, AND DATA RETRIEVAL METHOD

(71) Applicant: DENSO CORPORATION, Kariya, Aichi-pref. (JP)

(72) Inventor: Akihiro Ogasawara, Toyokawa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 527 days.

(21) Appl. No.: 14/784,436

(22) PCT Filed: Feb. 21, 2014

(86) PCT No.: PCT/JP2014/000907
§ 371 (c)(1),
(2) Date: Oct. 14, 2015

(87) PCT Pub. No.: WO2014/174744
PCT Pub. Date: Oct. 30, 2014

(65) Prior Publication Data
US 2017/0206254 A1 Jul. 20, 2017

(30) Foreign Application Priority Data
Apr. 25, 2013 (JP) .................. 2013-092434

(51) Int. Cl.
G06F 17/30 (2006.01)
(52) U.S. Cl.
CPC .............. G06F 17/30563 (2013.01)

(58) Field of Classification Search
CPC .................................. G06F 17/30563
See application file for complete search history.

(56) References Cited

U.S. PATENT DOCUMENTS

| 2004/0139844 | A1 | 7/2004 | Tsuboi | |
| 2004/0167856 | A1 | 8/2004 | Shibasaki et al. | |
| 2010/0039906 | A1* | 2/2010 | Strachota | G11B 27/002 369/30.27 |

FOREIGN PATENT DOCUMENTS

| JP | 2004185770 A | 7/2004 |
| JP | 2004258197 A | 9/2004 |
| JP | 2005148775 A | 6/2005 |
| JP | 2008159170 A | 7/2008 |

OTHER PUBLICATIONS

O'Neill, How to Rip a CD to MP3 & Auto-Name Files Correctly (Win), pp. 1-7 (Year: 2009).*

(Continued)

Primary Examiner — Albert M Phillips, III
(74) Attorney, Agent, or Firm — Harness, Dickey & Pierce, P.L.C.

(57) ABSTRACT

A data retrieval apparatus comprises: a local database which links data for retrieval with content attribute data and stores same; a data for retrieval extraction processing unit which extracts the data for retrieval from a medium; an attribute data retrieval processing unit which retrieves the attribute data corresponding to the data for retrieval from the local database; and a data for retrieval storage processing unit which stores the data for retrieval if the attribute data corresponding to the data for retrieval is not present in the local database.

6 Claims, 5 Drawing Sheets

(56) References Cited

OTHER PUBLICATIONS

Ars Technica, How to reset the CDDB within iTunes?, pp. 1-3 (Year: 2003).*
SuperSync iTunes Libraries in Perfect Harmony, 3 pages, Oct. 2012.*
International Search Report and Written Opinion (in Japanese with English Translation) for PCT/JP2014/000907, dated Mar. 25, 2014; ISA/JP.

* cited by examiner

FIG. 2

| TOC DATA | RETRIEVAL DATA | | | ATTRIBUTE DATA | | | |
| --- | --- | --- | --- | --- | --- | --- | --- |
| | FILE STRUCTURE DATA | WAVEFORM DATA | ... | CONTENT NAME DATA | ARTIST NAME DATA | PHOTOGRAPH DATA | ... |
| TOC (a) | STRUCTURE (a) | WAVEFORM (a) | ... | NAME (a) | ARTIST (a) | PHOTOGRAPH (a) | ... |
| TOC (b) | STRUCTURE (b) | WAVEFORM (b) | ... | NAME (b) | ARTIST (b) | PHOTOGRAPH (b) | ... |
| TOC (c) | STRUCTURE (c) | WAVEFORM (c) | ... | NAME (c) | ARTIST (c) | PHOTOGRAPH (c) | ... |
| TOC (d) | STRUCTURE (d) | WAVEFORM (d) | ... | NAME (d) | ARTIST (d) | PHOTOGRAPH (d) | ... |
| TOC (e) | STRUCTURE (e) | WAVEFORM (e) | ... | NAME (e) | ARTIST (e) | PHOTOGRAPH (e) | ... |
| ... | ... | ... | ... | ... | ... | ... | |

| RETRIEVAL DATA | | | | ATTRIBUTE DATA | | | |
|---|---|---|---|---|---|---|---|
| TOC DATA | FILE STRUCTURE DATA | WAVEFORM DATA | ... | CONTENT NAME DATA | ARTIST NAME DATA | PHOTOGRAPH DATA | ... |
| TOC (b) | STRUCTURE (b) | WAVEFORM (b) | ... | NAME (b) | ARTIST (b) | PHOTOGRAPH (b) | ... |
| TOC (e) | STRUCTURE (e) | WAVEFORM (e) | ... | NAME (e) | ARTIST (e) | PHOTOGRAPH (e) | ... |
| TOC (g) | STRUCTURE (g) | WAVEFORM (g) | ... | NAME (g) | ARTIST (g) | PHOTOGRAPH (g) | ... |
| ... | ... | ... | ... | ... | ... | ... | ... |

142

DATA RETRIEVAL APPARATUS, DATA RETRIEVAL PROGRAM, AND DATA RETRIEVAL METHOD

CROSS-REFERENCE TO RELATED APPLICATIONS

This application is a U.S. National Phase Application under 35 U.S.C. 371 of International Application No. PCT/JP2014/000907 filed on Feb. 21, 2014 and published in Japanese as WO 2014/174744 A1 on Oct. 30, 2014. This application is based on and claims the benefit of priority from Japanese Patent Application No. 2013-092434 filed on Apr. 25, 2013. The entire disclosures of all of the above applications are incorporated herein by reference.

TECHNICAL FIELD

The present disclosure relates to a data retrieval apparatus, a data retrieval program, and a data retrieval method.

BACKGROUND ART

For example, an audio device specifies a content recorded on a medium. For example, patent document 1 discloses a technique of creating a music list according to a transfer speed of a medium, and retrieving and specifying music data on the basis of the music list.

The inventor of the present application has found the following with regard to a technique related to a data retrieval apparatus, a data retrieval program, and a data retrieval method.

In the audio device, a technique of extracting retrieval data (also referred to as a data for retrieval) from an inserted medium, retrieving a database on the basis of the retrieval data, and specifying an attribute of a content is disclosed. The attribute of the content indicates a name of music, for example. In this technique, when the corresponding data is not present in the database, the attribute of the content is not specified.

PRIOR ART DOCUMENT

Patent Document

Patent document 1: JP 2008-159170 A

SUMMARY OF INVENTION

It is an object of the present disclosure to provide a data retrieval apparatus, a data retrieval program, and a data retrieval method that enable to specify attribute of a content recorded on a medium even when corresponding data is not present in a database.

According to an example of the present disclosure, a data retrieval apparatus includes a local database storing retrieval data and attribute data of a content, the retrieval data being in association with the attribute data of the content, a retrieval data extraction portion extracting the retrieval data from a medium that is inserted from the outside, an attribute data retrieval portion retrieving the attribute data corresponding to the retrieval data, which is extracted by the retrieval data extraction portion, from the local database; and, a retrieval data storage portion storing the retrieval data when the attribute data corresponding to the retrieval data, which is extracted by the retrieval data extraction portion, is not present in the local database. When the local database is updated, the attribute data retrieval portion re-retrieves the attribute data corresponding to the retrieval data stored in the retrieval data storage portion from the local database.

According to another example of the present disclosure, a data retrieval method performed by a data retrieval apparatus including a local database that stores retrieval data and attribute data of a content, the retrieval data being in association with the attribute data of the content is provided. The data retrieval method including: extracting the retrieval data from a medium that is inserted from an outside; retrieving the attribute data corresponding to the retrieval data extracted by the extracting the retrieval data from the local database; storing the retrieval data when the attribute data corresponding to the retrieval data extracted by the retrieving the attribute data is not present in the local database; and re-retrieving the attribute data corresponding to the retrieval data stored by the storing the retrieval data from the local database when the local database is updated.

A program according to an example of the present disclosure is a data retrieval program for executing the data retrieval method. The program for executing the procedures is stored in a non-transitory tangible storage medium.

According to the data retrieval apparatus, the data retrieval method, and the data retrieval program, when the corresponding attribute data is not present in the local database, the retrieval data used at the time of the retrieval is temporarily stored. Then, when the local database is updated, the re-retrieval of the attribute data is automatically performed on the basis of the stored retrieval data. Accordingly, even when the corresponding attribute data is not present in the local database, it may be possible to specify an attribute of a content recorded on a medium.

BRIEF DESCRIPTION OF DRAWINGS

The above and other aspects, features and advantages of the present disclosure will become more apparent from the following detailed description made with reference to the accompanying drawings. In the drawings:

FIG. 2 is a diagram illustrating an example of a local database;

FIG. 3 is a diagram illustrating an example of a user-specific database;

PREFERRED EMBODIMENTS FOR CARRYING OUT THE INVENTION

Figure 1:
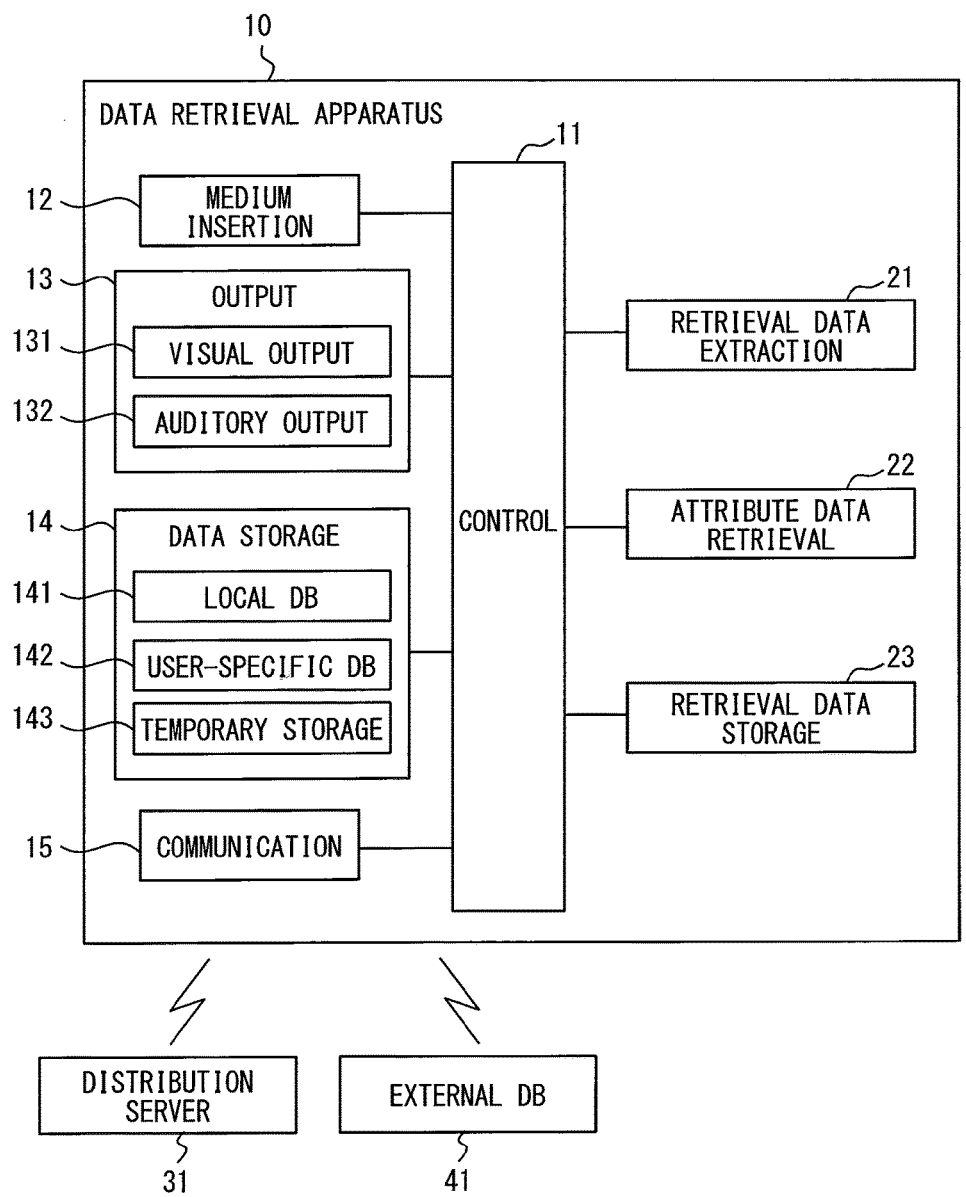
FIG. 1 is a schematic block diagram illustrating a configuration of a data retrieval apparatus according to the present embodiment.

An embodiment of the present disclosure will be described with reference to the drawings. A data retrieval apparatus 10 illustrated in FIG. 1 is used in, for example, an onboard audio device mounted to a vehicle. The data retrieval apparatus 10 includes a controller 11, a medium insertion portion 12, an output portion 13, a data storage portion 14, a communication portion 15. The controller 11 includes a CPU, a RAM, and a ROM, which are not shown in the drawing and controls the overall operation of the data retrieval apparatus 10. The controller 11 executes a data retrieval program in the CPU, and virtually realizes a retrieval data extraction portion 21, an attribute data retrieval portion 22, and a retrieval data storage portion 23 by software. The processing portions 21 to 23 may be realized together with, for example, the controller 11 as an integrated circuit in hardware.

Various types of media having a content such as, for example, music, video recorded thereon are inserted into the medium insertion portion 12. Incidentally, the medium may be, not only disks such as, for example, a CD, a DVD but also a USB memory device or the like. The output portion 13 includes a visual output portion 131 including such as a liquid crystal display, an organic EL display, and an auditory output portion 132 including such as an onboard speaker. The controller 11 reads content data from the medium inserted into the medium insertion portion 12, and outputs a content such as music, video from the output portion 13 on the basis of the content data.

The data storage portion 14 includes a storage device such as a hard disk drive. In this case, in the data storage portion 14, a local database 141 and a user-specific database 142 are provided. The data storage portion 14 includes a temporary storage region 143 that temporarily stores retrieval data (also referred to as a data for retrieval).

For example, as illustrated in FIG. 2, the local database 141 stores the retrieval data stored in various types of media in association with attribute data of a content recorded on the various types of media. Thus, the local database 141 stores the retrieval data and the attribute data, the retrieval data being in association with the attribute data. The retrieval data includes, for example, table of contents (TOC) data stored in various types of media, in other words, data indicating a content recorded on the medium, file structure data indicating file structures of the various types of media, waveform data indicating waveforms of sounds included in the various types of media. The attribute data of the content include, for example, content name data indicating a name of the content recorded on the medium, artist name data indicating an artist name, photograph data indicating a photograph used for an album cover.

For example, as illustrated in FIG. 3, the user-specific database 142 stores the attribute data that is actually retrieved by the data retrieval apparatus 10 in association with retrieval data that is actually used at the time of retrieving the attribute data. Thus, the user-specific database 142 stores the attribute data that is actually retrieved by the data retrieval apparatus 10 and the retrieval data that is actually used at the time of retrieving the attribute data, the retrieval data being in association with the attribute data. The user-specific database 142 stores the attribute data that is actually retrieved and the retrieval data that is actually used. The attribute data and the retrieval data stored in the user-specific database 142 are associated with each other. In examples in FIG. 2 and FIG. 3, a detailed content of each data is not shown.

The communication portion 15 includes, for example, a wireless communication module, and is communicably connected to an external data distribution server 31 through a not-shown Internet access point. The controller 11 receives update data of the local database 141 from the data distribution server 31 through the communication portion 15. When the controller 11 receives the update data from the data distribution server 31, the controller updates the local database 141 on the basis of the update data.

The communication portion 15 is also communicably connected to an external database 41 (hereinafter, referred to as an "external database 41") through an Internet access point. Similarly to the local database 141, the external database 41 stores the retrieval data stored in various types of media in association with the attribute data of the content stored to the various types of media. The content of the external database 41 is updated at all times or at fixed intervals on the basis of data collected from various information sources through the Internet. Accordingly, it is likely that the external database 41 is in a more up-to-date state than the local database 141. The external database 41 includes data collected from various information sources through the Internet, and thus it is likely that the content of the external database is more substantial than contents of the local database 141. That is, it is likely that the external database 41 stores the retrieval data and the attribute data regarding a larger number of media than those of the local database 141.

The retrieval data extraction portion 21 is an example of a retrieval data extraction portion. The retrieval data extraction portion 21 executes a retrieval data extraction process, and extracts the retrieval data from the medium when the medium is inserted into the medium insertion portion 12 from the outside. The retrieval data includes TOC data, file structure data, waveform data of the medium.

The attribute data retrieval portion 22 is an example of an attribute data retrieval portion. The attribute data retrieval portion 22 executes an attribute data retrieval process to retrieve the attribute data corresponding to the retrieval data extracted from the local database 141 by the retrieval data extraction portion 21. According to the attribute data retrieval process, when the attribute data corresponding to the retrieval data extracted by the retrieval data extraction portion 21 is present in the local database 141, the controller 11 specifies an attribute of the inserted medium, that is, a name of a content recorded on the medium, an artist name of the content on the basis of the attribute data. That is, when the attribute data corresponding to the retrieval data exists in the local database 141, the controller 11 specifies the attribute of the inserted medium.

The retrieval data storage portion 23 is an example of a retrieval data storage portion. According to the retrieval process performed by the attribute data retrieval portion 22, when the attribute data corresponding to the retrieval data extracted by the retrieval data extraction portion 21 is not present in the local database 141, the retrieval data storage portion 23 executes a retrieval data storage process, and stores the retrieval data in the temporary storage region 143. The retrieval data stored in the temporary storage region 143 is automatically erased when the corresponding attribute data is retrieved or when the retrieval data is stored in the user-specific database 142.

When the local database 141 is updated, the attribute data retrieval portion 22 executes an attribute data re-retrieval process to re-retrieve (again retrieve) the attribute data corresponding to the retrieval data stored in the temporary storage region 143, from the updated local database 141. When the communication portion 15 of the data retrieval apparatus 10 is connected to the external database 41 regardless of whether the local database 141 has been updated, the attribute data retrieval portion 22 executes an attribute data re-retrieval process. Thus, the attribute data retrieval portion 22 re-retrieves the attribute data corresponding to the retrieval data stored in the temporary storage region 143 from the external database 41 that is in an up-to-date state.

During the retrieval and re-retrieval of the attribute data, the attribute data retrieval portion 22 retrieves the attribute data corresponding to the TOC data included in the retrieval data extracted by the retrieval data extraction portion 21, from the local database 141. When the attribute data corresponding to the TOC data is not present in the local database 141, the attribute data retrieval portion 22 retrieves the attribute data corresponding to the file structure data that is data other than the TOC data included in the retrieval data extracted by the retrieval data extraction portion 21, from the local database 141. When the attribute data corresponding to the file structure data is not present in the local database 141, the attribute data retrieval portion 22 retrieves the attribute data corresponding to the waveform data that is data other than the TOC data and the file structure data included in the retrieval data extracted by the retrieval data extraction portion 21, from the local database 141. Accordingly, the attribute data retrieval portion 22 retrieves the corresponding attribute data on the basis of the TOC data included in the retrieval data, and sequentially retrieves the corresponding attribute data on the basis of data other than the TOC data when the corresponding attribute data has not been retrieved.

Figure 4:
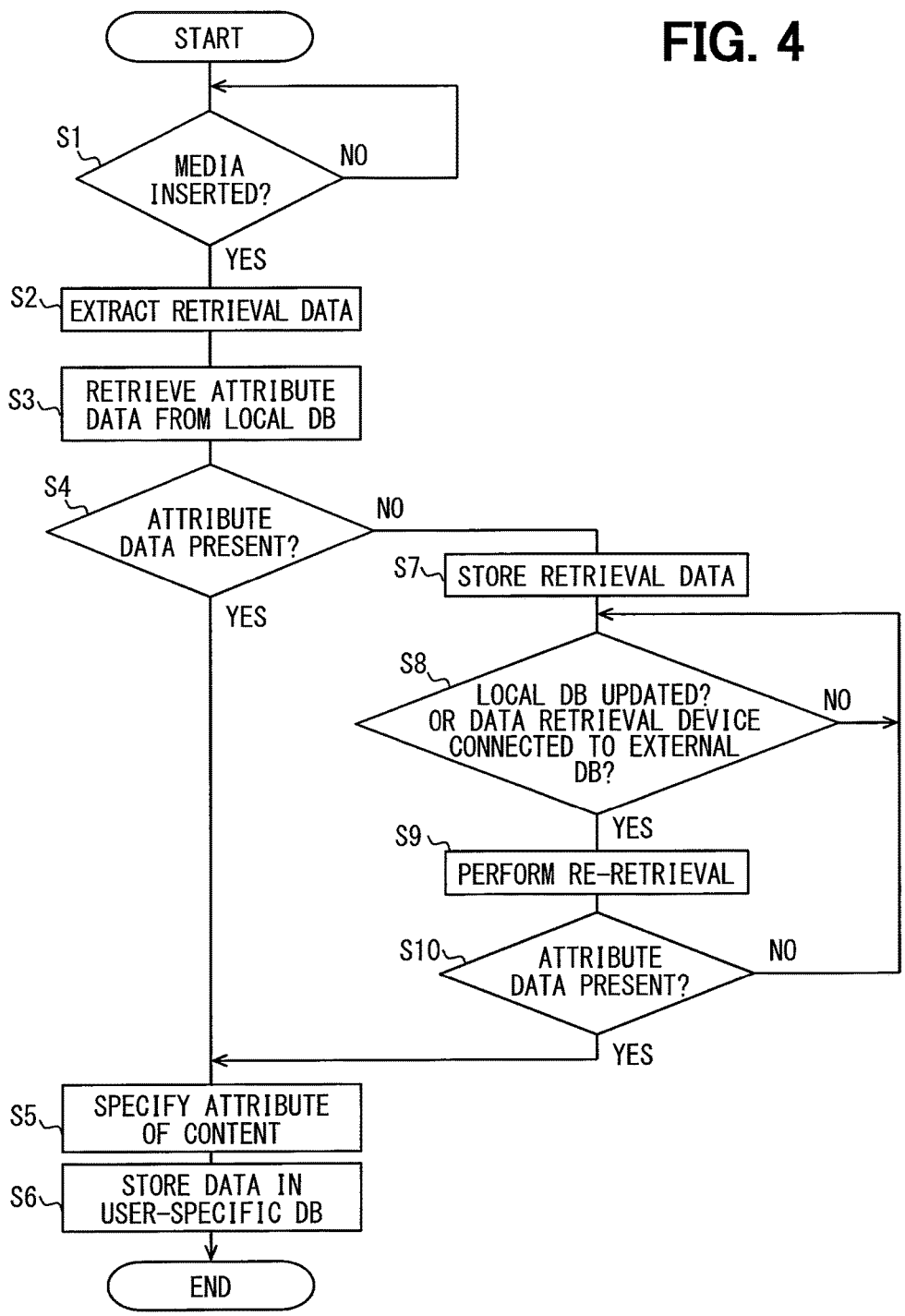
FIG. 4 is a flow chart illustrating an example of operation content of the data retrieval apparatus.
Figure 5:
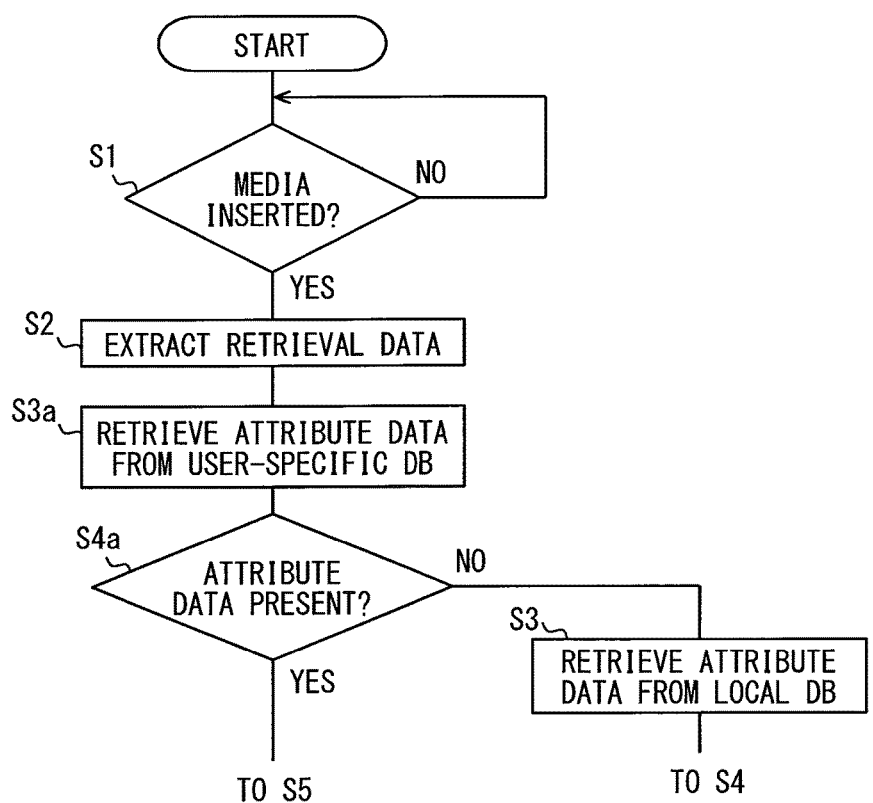
FIG. 5 is a flow chart illustrating an example of operation content of the data retrieval apparatus.

An example of a data retrieval process by the data retrieval apparatus 10 will be described referring to FIG. 4 and FIG. 5. When a medium is inserted from the outside (S1: YES), the data retrieval apparatus 10 extracts the retrieval data from the medium (S2). S2 is an example of a retrieval data extraction step. The data retrieval apparatus 10 retrieves the attribute data corresponding to the extracted retrieval data from the local database 141 (S3). S3 is an example of an attribute data retrieval step. When the corresponding attribute data is present in the local database 141 (S4: YES), the data retrieval apparatus 10 specifies an attribute of the content recorded on the medium on the basis of the attribute data (S5). The data retrieval apparatus 10 associates the retrieved attribute data in the user-specific database 142 with the retrieval data used at the time of retrieving the attribute data, and stores the retrieved attribute data in the user-specific database 142 and the retrieval data used at the time of retrieving the attribute data (S6).

When the corresponding attribute data is not present in the local database 141 (S4: NO), the data retrieval apparatus 10 stores the retrieval data in the temporary storage region 143 (S7). S7 is an example of a retrieval data storage step. When the local database 141 is updated or when the data retrieval apparatus 10 is connected to the external database 41 (S8: YES), the data retrieval apparatus re-retrieves attribute data (S9). S9 is an example of an attribute data re-retrieval step.

In S9, when the local database 141 is updated, the data retrieval apparatus 10 re-retrieves the attribute data corresponding to the stored retrieval data from the updated local database 141. When the data retrieval apparatus 10 is connected to the external database 41, the data retrieval apparatus retrieves attribute data corresponding to the stored retrieval data from the external database 41 in an up-to-date state. When the corresponding attribute data is retrieved (S10: YES), the data retrieval apparatus 10 shifts to S5. When any corresponding attribute data is not retrieved, the processing shifts to S8.

According to the process, whenever the attribute data is actually retrieved or re-retrieved, the attribute data and the retrieval data used at the time of retrieving the attribute data are stored in the user-specific database 142. Accordingly, as illustrated in FIG. 5, when a medium is inserted in a subsequent time (S1: YES), and when the retrieval data is extracted from the medium (S2), the data retrieval apparatus 10 retrieves the attribute data corresponding to the retrieval data from the user-specific database 142 (S3a). When the attribute data corresponding to the retrieval data is not present in the user-specific database 142 (S4a: NO), the data retrieval apparatus 10 retrieves the attribute data corresponding to the retrieval data from the local database 141 (S3).

When the attribute data corresponding to the retrieval data is present in the user-specific database 142 (S4a: YES), the processing shifts to S5.

As described above, according to the present embodiment, when the attribute data corresponding to the inserted medium is not present in the local database 141, the retrieval data used at the time of the retrieval is temporarily stored in the temporary storage region 143. And then, when the local database 141 is updated, the re-retrieval of the attribute data is automatically performed on the basis of the retrieval data stored in the temporary storage region 143. Accordingly, it may be possible that, even when the corresponding attribute data is not present in the local database 141, the attribute of the content recorded on the medium is specified using the fact that the local database 141 has been updated, as a trigger.

According to the present embodiment, when attribute data corresponding to the inserted medium is not present in the local database 141, the retrieval data used at the time of the retrieval is temporarily stored in the temporary storage region 143. And then, when the data retrieval apparatus 10 is connected to the external database 41, the re-retrieval of the attribute data is automatically performed on the basis of the stored retrieval data. Accordingly, it may be possible that, even when the corresponding attribute data is not present in the local database 141, the attribute of the content recorded on the medium is specified using the fact that the data retrieval apparatus 10 is connected to the external database 41, as a trigger.

According to the present embodiment, when the medium is inserted, the data retrieval apparatus 10 retrieves the attribute data corresponding to the extracted retrieval data from the user-specific database 142. When the attribute data corresponding to the retrieval data is not present in the user-specific database 142, the attribute data corresponding to the retrieval data is retrieved from the local database 141. The retrieval data and the attribute data, which were actually retrieved or re-retrieved in the past, that is, the data related to the medium that a user often uses is stored in the user-specific database 142. Accordingly, the attribute data is retrieved from the user-specific database 142 during the insertion of the medium initially, and it may be possible to increase the probability of retrieve of the corresponding attribute data. Therefore, it may be possible to prevent a retrieval process for the local database 141 or a retrieval process for the external database 41 from being performed wastefully.

According to the present embodiment, the data retrieval apparatus 10 initially retrieves the corresponding attribute data on the basis of the TOC data included in the retrieval data extracted from the medium, from the local database 141. When the attribute data corresponding to the TOC data is not present in the local database 141, the data retrieval apparatus 10 retrieves the corresponding attribute data on the basis of data other than the TOC data included in the retrieval data from the local database 141. Accordingly, even when the attribute data is not retrieved on the basis of the TOC data, which is generally included in various types of media, it may be possible to retrieve the attribute data on the basis of other data, and to improve probability that the corresponding attribute data is retrieved.

The present disclosure is not limited to the present embodiment, and can be applied to various embodiments without departing from the scope of the present disclosure. For example, the retrieval data may include data other than the data described in the present embodiment. The attribute data may include data other than the data described in the present embodiment.

According to the data retrieval apparatus according to an example of the embodiment of the present disclosure, a local database stores the retrieval data and the attribute data of the content, which is associated with the retrieval data. A retrieval data extraction portion extracts the retrieval data from the medium, which is inserted from the outside. An attribute data retrieval portion retrieves the attribute data corresponding to the retrieval data extracted by the retrieval data extraction portion from a local database. When the attribute data corresponding to the retrieval data extracted by the retrieval data extraction portion is not present in the local database, a retrieval data storage portion stores the retrieval data. When the local database is updated, the attribute data retrieval portion re-retrieves the attribute data corresponding to the retrieval data stored in the retrieval data storage portion from the local database.

According to this configuration, when the corresponding attribute data is not present in the local database, the retrieval data used at the time of the retrieval is temporarily stored. And then, when the local database is updated, the re-retrieval of the attribute data is automatically performed on the basis of the stored retrieval data. Accordingly, even when the corresponding attribute data is not present in the local database, it may be possible to specify the attribute of a content recorded on a medium.

It is noted that a flowchart or a processing of the flowchart in the present application includes multiple steps (also referred to as sections), each of which are represented, for example, as S10. Further, each section may be divided into several sub-sections, and several sections may be combined into a single section. Further, each section provided in this manner may be referred to as a device, a module, or means.

While the embodiments, the constructions, the modes of the present disclosure have been described with reference to embodiments thereof, it is to be understood that the disclosure is not limited to the present embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. A data retrieval apparatus comprising:
a local database that stores data for retrieval and attribute data of a content, the data for retrieval being in association with the attribute data of the content;
a temporary storage region that temporarily stores the data for retrieval in a predetermined case;
a controller that is configured to
extract the data for retrieval from a medium inserted from an outside;
retrieve the attribute data corresponding to the data for retrieval extracted from the local database;
store the data for retrieval to the temporary storage region, as the predetermined case, when the attribute data corresponding to the data for retrieval extracted is not present in the local database; and
a user-specific database that is configured to associate and store (i) the attribute data retrieved by the controller and (ii) the data for retrieval used at a time of retrieving the attribute data,
wherein:

the data for retrieval at least includes table of contents (TOC) data of the medium;
when the local database is updated,
the controller is configured to again retrieve the attribute data corresponding to the data for retrieval stored in the temporary storage region, from the local database updated; and
when the medium is inserted from the outside,
the controller is configured to retrieve the attribute data corresponding to the data for retrieval extracted by the controller, from the user-specific database before retrieval of the local database, and
when the medium is inserted from the outside and also when the controller retrieves the attribute data corresponding to the data for retrieval extracted by the controller, from the user-specific database and also when the attribute data corresponding to the data for retrieval extracted by the controller is not present in the user-specific database,
the controller is configured to retrieve from the local database,
(i) the attribute data corresponding to the TOC data included in the data for retrieval extracted by the controller,
(ii) the attribute data corresponding to a different data other than the TOC data included in the data for retrieval in a case where the attribute data corresponding to the TOC data is not present in the local database, and
(iii) the attribute data corresponding to a further different data other than the TOC data and the different data included in the data for retrieval in a case where the attribute data corresponding to the different data is not present in the local database.

2. The data retrieval apparatus according to claim 1, wherein:
when the attribute data retrieval portion is connected to an external database storing the data for retrieval and the attribute data, the data for retrieval being in association with the attribute data,
the attribute data retrieval portion re-retrieves the attribute data corresponding to the data for retrieval stored in the retrieval data storage portion, from the external database.

3. The data retrieval apparatus according to claim 1, wherein the TOC data includes at least one of: data indicating a content recorded on the medium, file structure data indicating file structures of the various types of media, and waveform data indicating waveforms of sounds included in the various types of media.

4. The data retrieval apparatus according to claim 1, wherein the TOC data includes each of: data indicating a content recorded on the medium, file structure data indicating file structures of the various types of media, and waveform data indicating waveforms of sounds included in the various types of media.

5. A non-transitory tangible storage medium storing a data retrieval program operating in a data retrieval apparatus including a local database that stores data for retrieval and attribute data of a content and a temporary storage region that temporarily stores the data for retrieval in a predetermined case, the data for retrieval being in association with the attribute data of the content, the data retrieval program performing:
extracting the data for retrieval from a medium inserted from an outside, the data for retrieval at least including table of contents (TOC) data of the medium;

retrieving the attribute data corresponding to the data for retrieval extracted from the local database;

storing the data for retrieval to the temporary storage region, as the predetermined case, when the attribute data corresponding to the data for retrieval is not present in the local database;

associating and storing to a user-specific database, the attribute data retrieved and the data for retrieval used at a time of retrieving the attribute data;

retrieving again the attribute data corresponding to the data for retrieval stored in the temporary storage region from the local database when the local database is updated; and when the medium is inserted from the outside, retrieving the attribute data corresponding to the extracted data for retrieval from the user-specific database before retrieval of the local database, and when the medium is inserted from the outside and also when the attributed data that corresponds to the extracted data for retrieval is retrieved from the user-specific database and also when the attribute data corresponding to the extracted data for retrieval is not present in the user-specific database, retrieving from the local database:
  (i) the attribute data corresponding to the TOC data included in the extracted data for retrieval,
  (ii) the attribute data corresponding to a different data other than the TOC data included in the data for retrieval in a case where the attribute data corresponding to the TOC data is not present in the local database, and
  (iii) the attribute data corresponding to a further different data other than the TOC data and the different data included in the data for retrieval in a case where the attribute data corresponding to the different data is not present in the local database.

6. A data retrieval method performed by a data retrieval apparatus including a local database that stores data for retrieval and attribute data of a content and a temporary storage region that temporarily stores the data for retrieval in a predetermined case, the data for retrieval being in association with the attribute data of the content, the data retrieval method comprising:

extracting the data for retrieval from a medium inserted from an outside, the data for retrieval at least including table of contents (TOC) data of the medium;

retrieving the attribute data corresponding to the data for retrieval extracted from the local database;

storing the data for retrieval to the temporary storage region, as the predetermined case, when the attribute data corresponding to the data for retrieval is not present in the local database;

associating and storing to a user-specific database, the attribute data retrieved and the data for retrieval used at a time of retrieving the attribute data;

retrieving again the attribute data corresponding to the data for retrieval stored in the temporary storage region from the local database when the local database is updated; and when the medium is inserted from the outside, retrieving the attribute data corresponding to the extracted data for retrieval from the user-specific database before retrieval of the local database, and when the medium is inserted from the outside and also when the attributed data that corresponds to the extracted data for retrieval is retrieved from the user-specific database and also when the attribute data corresponding to the extracted data for retrieval is not present in the user-specific database, retrieving from the local database:
  (i) the attribute data corresponding to the TOC data included in the extracted data for retrieval,
  (ii) the attribute data corresponding to a different data other than the TOC data included in the data for retrieval in a case where the attribute data corresponding to the TOC data is not present in the local database, and
  (iii) the attribute data corresponding to a further different data other than the TOC data and the different data included in the data for retrieval in a case where the attribute data corresponding to the different data is not present in the local database.

* * * * *